(12) United States Patent
Heijkants et al.

(10) Patent No.: US 7,786,326 B2
(45) Date of Patent: Aug. 31, 2010

(54) POLYACYLURETHANES BASED ON DIISOCYANATES AND POLYESTERPOLYOLS

(75) Inventors: Ralf Guillaume Jean Catharina Heijkants, Eindhoven (NL); Arend Jan Schouten, Peize (NL); Leendert Willem Schwab, Groningen (NL); Frans Vincent Roukes, Groningen (NL); Albert Johan Pennings, Maaseik (BE)

(73) Assignee: Stichting Voor de Technische Wetenschappen, Utrecht (NL)

( * ) Notice: Subject to any disclaimer, the term of this patent is extended or adjusted under 35 U.S.C. 154(b) by 468 days.

(21) Appl. No.: 11/572,457

(22) PCT Filed: Jul. 21, 2005

(86) PCT No.: PCT/NL2005/000528

§ 371 (c)(1),
(2), (4) Date: Nov. 6, 2007

(87) PCT Pub. No.: WO2006/009443

PCT Pub. Date: Jan. 26, 2006

(65) Prior Publication Data

US 2008/0214771 A1 Sep. 4, 2008

(30) Foreign Application Priority Data

Jul. 21, 2004 (EP) .................. 04077114

(51) Int. Cl.
*C07C 273/00* (2006.01)
(52) U.S. Cl. .............. 564/44; 564/45; 528/59; 528/66; 528/80; 528/83; 528/369; 560/25; 560/26; 560/115; 560/158
(58) Field of Classification Search .......... 564/44, 564/45; 528/369, 59, 66, 80, 83; 560/25, 560/26, 115, 158
See application file for complete search history.

(56) References Cited

U.S. PATENT DOCUMENTS

| 4,447,591 A | | 5/1984 | Watanabe et al. | |
|---|---|---|---|---|
| 4,661,530 A | * | 4/1987 | Gogolewski et al. | ........ 521/137 |
| 4,866,103 A | | 9/1989 | Cassidy et al. | |
| 5,319,054 A | | 6/1994 | Slack et al. | |
| 5,556,933 A | | 9/1996 | Yabuta et al. | |
| 5,583,161 A | * | 12/1996 | Ando et al. | ............ 521/49 |
| 6,784,273 B1 | * | 8/2004 | Spaans et al. | ............ 528/65 |
| 2004/0249106 A1 | * | 12/2004 | Gindin et al. | ............ 528/59 |

FOREIGN PATENT DOCUMENTS

| EP | 0 393 903 A2 | | 4/1990 |
|---|---|---|---|
| JP | 06228268 A | * | 8/1994 |
| JP | 07242720 A | * | 9/1995 |
| JP | 2000212289 A | * | 8/2000 |

OTHER PUBLICATIONS

Patent Abstracts of Japan, vol. 018, No. 604, Nov. 17, 1994.
Masami Kanamaru et al., "A Novel Polymerization of Bis(N-acyl isocyanate)s and Dicarboxylic acids—synthesis of Poly (N-acylamide)s," Macromolecules, American Chemical Society, vol. 28, No. 24, pp. 7979-7982, Nov. 20, 1995.
Patent Abstracts of Japan, vol. 018, No. 604 (C-1275) (Nov. 17, 1994) & JP 06 228268 A (Idemitsu Kosan Co., Ltd.) (Aug. 16, 1994) (Abstract).
Kanamaru, M., et al., "A Novel Polymerization of Bis(N-Acyl Isocyanate)S and Dicarboxylic Acids-Synthesis of Poly(N-Acylamide)S", Macromolecules, American Chemical Society, vol. 28, No. 24, pp. 7979-7982 (Nov. 20, 1995).
Endo, T., et al. "Synthesis of Poly(*N*-acylurethane)s, a New Class of Polyurethanes", Macromolecules, American Chemical Society, vol. 27, No. 14, (1994), pp. 3694-3697.

* cited by examiner

*Primary Examiner*—Milton I Cano
*Assistant Examiner*—Michael Leonard
(74) *Attorney, Agent, or Firm*—Gilberto M. Villacorta; Sunit Talapatra; Foley & Lardner LLP

(57) ABSTRACT

The present invention relates to a polyacylurethane having the following general formula (I) and a process for the preparation of such polyacylurethane. Preferred embodiments of the polyacylurethanes according to the invention have elastomeric properties. The polyacylurethanes can suitable be used in biodegradable, biocompatible and/or biomedical devices.

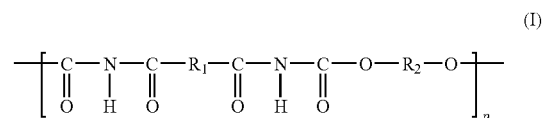

(I)

22 Claims, No Drawings

POLYACYLURETHANES BASED ON DIISOCYANATES AND POLYESTERPOLYOLS

FIELD OF THE INVENTION

The present invention relates to polyacylurethanes, in particular to polyacylurethanes having "soft" and "hard" segments within the polymer main chain giving rise to microphase separated morphology. Microphase separation is known to be caused by physical incompatibility between the soft and hard segments (J. C. West and S. L. Cooper, in *Science and Technology of Rubber*, F. R. Eirich (Ed.), Academic Press, New York, 1978, Chapter 13, pages 531-567; S. L. Cooper and J. C. West in *Development in block copolymers*, I. Goodman (Ed.), Elsevier Applied Science Publications, 2000, pages 521-543).

BACKGROUND OF THE INVENTION

Polyacylurethanes are known in the art and have a distinct advantage over conventional polyurethanes in that the monomer diacylisocyanate have activated isocyanate groups due to the adjacent carbonyl group. The activated isocyanate groups appear to be more reactive towards activated hydrogen atoms, e.g. hydroxyl groups, and show a higher propagation rate in chain extension processes. Moreover, diacylisocyanate monomers can easily and safely be prepared since no phosgene is necessary. A process for the manufacture of these monomers is inter alia disclosed in U.S. Pat. Nos. 4,769,485 and 5,386,057, both incorporated by reference herein.

The synthesis of polyacylurethanes is also known in the art and involves two general processes. The first process is disclosed in e.g. U.S. Pat. No. 5,556,933, incorporated by reference herein, and involves the polymerisation of acylcarmabates having the following general formula:

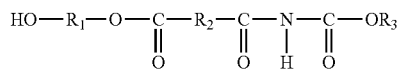

wherein $R_1$ is an alkylene group, preferably an alkylene group having a molecular weight of 28 to 30,000, wherein the alkylene group may contain an alicyclic group, an aromatic group or an oxygen atom, $R_2$ is an alkylene group, an arylene group or an alkenylene group having 1-8 carbon atoms and $R_3$ is an alkyl or aryl group having 1-18 carbon atoms that may also contain an oxygen atom. In a preferred embodiment, $R_1$ is derived from a diol including low molecular weight, oligomeric and high-molecular weight diols such as diols having a number average molecular weight of preferably 300 to 3000. Examples that are mentioned in U.S. Pat. No. 5,556,933 include polycaprolactone diol, polytetrahydrofuran diol and polydimethylsiloxane diol. The polyacylurethanes are prepared from the monomer shown above in the absence of a solvent and a catalyst and have a molecular weight of 500 to 100,000 (example 6 discloses the highest $M_n$ of 48,000). The polyacylurethanes are said to be useful in various industrial applications such as a modifier for a hydroxyl group containing material, a high functional coating composition and an adhesive. However, tensile properties are not disclosed.

The second process is disclosed in e.g. Polymeric Preprints Japan, Vol. 42, No. 6, pages 1922-1924 (1993)—cf. U.S. Pat. No. 5,555,933, column 1, lines 46-47—and involves the polycondensation of a diacylisocyanate and a diol leading to polyacylurethanes having a structure different from the polyacylurethanes disclosed in U.S. Pat. No. 5,556,933:

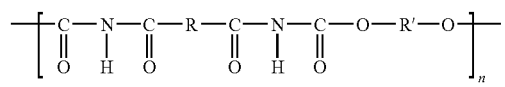

wherein R and R' are hydrocarbyl groups. Again, tensile properties are not disclosed.

JP 6228268 discloses a similar process, i.e. the polymerisation of diacylisocyanates (wherein X contains less than 40 carbon atoms and may be substituted alkylene, substituted cycloalkylidene such as terephthaloyl diisocyanate) with diols (wherein Y is alkylene) to polymers having a number average molecular weight of 1000 to 10,000. JP 6228268 is silent about tensile properties.

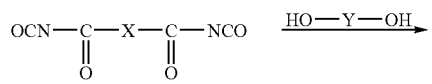

Likewise, Endo et al., Macromolecules 27, 3694-3697, 1994, disclose the synthesis of polyacylurethanes wherein isophthaloyl diisocyanate, terephthaloyl diisocyanate or 5-t-Bu-isophthaloyl diisocyanate are reacted with aliphatic diols, e.g. 3,3-dimethyl-1,5-pentane diol. The polyacylurethanes obtained have a number average molecular weight in the range of about 10000 to about 20000 and glass transition temperatures in the range of about 65° to about 145° C. Endo et al. also disclose the reaction between isophthaloyl diisocyanate and poly(tetramethylene oxide) having a number average molecular weight of about 750 which provided a polyacylurethane having a number average molecular weight of about 23000. Endo et al. does not disclose that the polyacylurethanes have elastomeric properties.

U.S. Pat. No. 4,608,420 discloses a process wherein N-alkylcarboxy imides are reacted with for example polymeric diols according to the following equation, wherein R is a hydrocarbyl radical having 2-10 carbon atoms, R' may be e.g. be alkyl having 3-10 carbon atoms and R" is derived from e.g. a polymeric diol:

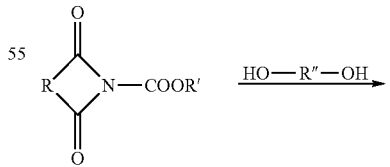

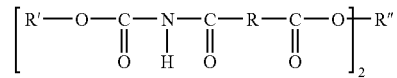

U.S. Pat. No. 4,608,420 does not discloses tensile properties either.

SUMMARY OF THE INVENTION

The present invention relates to polyacylurethanes that are prepared by copolymerising diacylisocyanates and diols, wherein the diols are polyesterpolyols having a number average molecular weight of 106 to 50,000. The present invention relates in particular to polyacylurethanes having the following general formula (I):

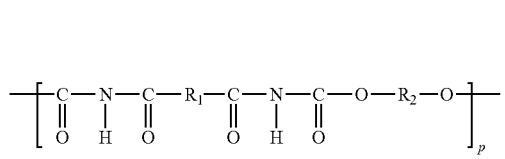

wherein:
$R_1$ is an alkylene group, an arylene group, an alkenylene group or an alkynylene group, the alkylene group, arylene group, alkenylene group and alkylene group optionally being substituted and having a number average molecular weight of 154 to 50,000;

$R_2$ is a residue derived from a polyesterpolyol having terminal hydroxyl groups, the polyesterpolyol having a number average molecular weight of 106 to 50,000;

p denotes the degree of polymerisation; and wherein the polyacylurethane has a number average molecular weight of 260 to 100,000. Preferably, the lower limit of the number average molecular weight is 1000, more preferably 2500 and most preferably 5000. The upper limit of the number average molecular weight is preferably 50,000.

The lower limit of the number average molecular weight of the diacylisocyanate moiety is based on the structure OCN—C(O)—CH$_2$—C(O)—NCO which has the molecular formula $C_5H_2O_4N_2$ (MW is 154). The lower limit of the number average molecular weight of the polyesterpolyol moiety is based on the structure HO—CH$_2$—C(O)—O—CH$_2$—OH which has the molecular formula $C_3H_6O_4$ (MW is 106). Consequently, the lower limit of the number average molecular weight of the polyacylurethanes according to the present invention is based on the following structure:

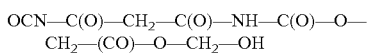
OCN—C(O)—CH$_2$—C(O)—NH—C(O)—O—CH$_2$—(CO)—O—CH$_2$—OH which has the molecular formula $C_8H_8O_8N_2$ (MW is 260). The lower limits for the polyesterpolyols and polyacylurethanes are here defined as above so that they also include oligomers.

The polyacylurethanes of the present invention are biodegradable polymers and are therefore very suitable in biodegradable, biocompatible and/or biomedical applications, e.g. devices such as bone replacements. In addition, the polyacylurethanes according to the invention show microphase separation providing elastomeric properties to the polyacylurethanes.

DETAILED DESCRIPTION OF THE INVENTION

According to the invention, it is preferred that the polyesterpolyol having terminal hydroxyl groups has the following general formula (II):

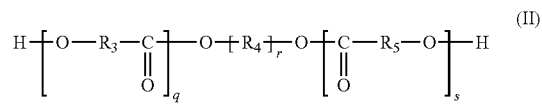

wherein $R_3$ and $R_5$ are independently selected from $C_1$-$C_{12}$ alkylene groups, $C_2$-$C_{12}$ alkenylene groups, $C_2$-$C_{12}$ alkynylene groups, $C_6$-$C_{20}$ cycloalkylene groups, $C_6$-$C_{20}$ cycloalkenylene groups, $C_6$-$C_{20}$ cycloalkynylene groups, $C_7$-$C_{20}$ alkarylene groups, $C_7$-$C_{20}$ arylalkylene groups, $C_8$-$C_{20}$ arylalkenylene groups, $C_8$-$C_{20}$ arylalkynylene groups, the alkylene groups, alkenylene groups, alkynylene groups, cycloalkylene groups, cycloalkenylene groups, cycloalkynylene groups, alkarylene groups, arylalkylene groups, arylalkenylene groups and arylalkynylene groups optionally being substituted with one or more substituents independently selected from the group consisting of $C_1$-$C_{12}$alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups, $C_6$-$C_{12}$ cycloalkyloxy groups, halogens and silyl groups, wherein the silylgroups can be represented by the formula $(R_6)_3Si$—, wherein $R_6$ is independently selected from the group consisting of $C_1$-$C_{12}$ alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups and $C_6$-$C_{12}$ cycloalkyloxy groups;

$R_4$ is a $C_2$-$C_{12}$ alkylene group, a $C_2$-$C_{12}$ alkenylene group or a $C_2$-$C_{12}$ alkynylene group, wherein the alkylene group, the alkenylene group and the alkynylene group is optionally interrupted by one or more heteroatoms, the heteroatoms being selected from O, N or S; and q, r and s are independently in the range of 1-300.

It is furthermore preferred that $R_1$ is an arylene group, preferably an arylene group having a molecular weight of 76 (which corresponds to the molecular formula —$C_6H_4$—) to 1000. More preferably, $R_1$ is an arylene group having a molecular weight of 76 to 500. Suitable examples of arylene groups are phenylene, naphthylene and phenanthrylene, which may be unsubstituted or substituted with one or more $C_1$-$C_6$ alkyl groups, $(R_6)_3Si$ groups, or halogen atoms, preferably chloride or bromine. Even more preferably, $R_1$ is a 1,4-phenylene group or a 1,3-phenylene group. Most preferably, $R_1$ is a 1,4-phenylene group.

According to the invention, it is preferred that $R_3$ and $R_5$ are selected from $C_2$-$C_{12}$ alkylene groups, e.g. ethylene, propylene, butylene, pentylene and hexylene. Most preferably, $R_3$ and $R_5$ are pentylene.

More preferably, $R_4$ is a $C_2$-$C_{12}$ alkylene group, most preferably butylene.

Preferably, q, r and s are independently in the range of 1-100.

According to the invention, it is preferred that the number average molecular weight of the polyesterpolyol having terminal hydroxyl groups is 106 to 10,000. More preferably, the number average molecular weight of the polyesterpolyol having terminal hydroxyl groups is 500 to 10,000, even more preferably 1000 to 10,000, even more preferably 500 to 5000, even more preferably 1000 to 5000, and most preferably 1000 to 4000, in particular because polyacylurethanes comprising such polyesterpolyol moieties surprisingly have elastomeric properties as will be further explained below.

The present invention also relates to a process for the preparation of a polyacylurethane, wherein a diisocyanate compound of the following general formula (III):

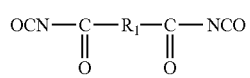
(III)

is reacted with a polyesterpolyol having terminal hydroxyl groups that has the following general formula (IV):

wherein $R_1$ and $R_2$ are as defined above. Preferred embodiments of $R_1$ and $R_2$ are defined above. Most preferably, $R_1$ is a 1,4-phenylene group so that the most preferred embodiment of the diisocyanate of formula (III) is terephthaloyl diisocyanate. However, as will be apparent to the person skilled in the art, terephthaloyl diisocyanate of technical grade may comprise minor amounts of one or more of the regioisomers isophthaloyl diisocyanate and phthaloyl diisocyanate.

Preferably, the polyesterpolyol having terminal hydroxyl groups has the structure according to formula (II). Most preferably, the polyesterpolyol having terminal hydroxyl groups is prepared from ε-caprolactone and poly(THF), the latter also being known as poly(1,4-butane diol) and poly(tetramethylene oxide), wherein the polyesterpolyol having terminal hydroxyl groups has a number average molecular weight of 500 to 5000, preferably of 700 to 2000, more preferably of 1000 to 2000. However, as will be apparent to the person skilled in the art of polyurethane chemistry, polyols as chain extender such as poly(THF) may be replaced by their diamine counterparts, e.g. 1,4-diaminobutane.

Alternatively, the process may also be conducted by reacting the diisocyanate compound of the general formula (III) with a compound of the general formula (V) and a compound of the general formula (VI):

wherein $R_3$ and $R_4$ are as defined above. Obviously, the compounds according to formula (V) may be used in their alk-enolide form. That is, if $R_3$ is pentylene, the compound ε-caprolactone is preferably used.

It will also be apparent to the person skilled in the art that the alkyl, alkenyl, alkynyl, alkoxy, alkenyloxy, alkynyloxy, alkylene, alkenylene and alkynylene groups may be linear or branched.

According to the invention, the process is preferably conducted in the absence of a catalyst, in particular because the catalysts commonly used in polyurethane chemistry are poisonous.

Although chain extension reactions and condensations with acylisocyanates can be conducted in solvents such as DMSO (dimethylsolfoxide), DMAc (dimethylacetamide) and NMP (N-methylpyrrolidone), acylisocyanates may react with such solvents giving rise to undesired side products. It is therefore preferred that the process is conducted in the absence of a solvent, i.e. in the bulk, unless the propagation rate of the chain extension reaction is much faster than the rate of the side reactions.

It furthermore appeared that the process is advantageously conducted in an extruder, preferably an extruder provided with a feed back loop. In such extruders the reacting mass is brought into circulation at an elevated temperature for a particular period of time. During this process the chain extension reaction proceeds thereby producing polymer molecules having increasingly higher molecular weight (increasingly higher viscosity). As a result, the internal pressure in the extruder increases which is a measure of the conversion. If the pressure no longer increases, the chain extension reaction is completed where after the product is pressed through the die.

Tensile Properties

The large variety in molecular weights of the hard and soft segments yields the possibility to tailor mechanical properties. As can be seen in Table 3 (see Examples), polymers with a low content of hard segment, namely PAU2000, 3000 and 4000, have a high Young's modulus due to the high amount of crystalline polyesterpolyol present. Upon increasing the hard segment concentration, the polyester chain length will become shorter thereby reducing the fraction of crystalline polyesterpolyol and thus decreasing the modulus of the polymer. For PAU1500 and lower, however, the increase of hard segment concentration will enable hard segments to phase separate, which leads to an increase in modulus.

Another clear difference between the materials is the variation of strain at break, PAU3000, 4000 and poly(ε-caprolactone) itself show a low strain at break. This is not believed to be caused by the high crystallinity of these materials. Although the inventors do not wish to be bound by theory, they assume that it is caused by the low molecular weight of these polymers, as poly(ε-caprolactone) with a molecular weight of $1.34 \cdot 10^5$ g/mol has a strain at break of 750% (cf. Velanker, S; Cooper, S. L. *Macromolecules* 1998, 31, 9181-9192). PAU1000 and PAU2000 show more or less the same behaviour, after the initial modulus, both show a yield point followed by a plateau. The presence of a yield point implicates that both polymers have some form of crystallinity/physical crosslinks in a continuos phase. In the case of PAU1000 this is crystalline hard segment whereas in the case of PAU2000 this is crystalline poly(ε-caprolactone). PAU1250 and PAU1500 show excellent elastomeric behaviour. Both have a low initial modulus followed by a sigmoidal curve and a very high strain at break (more than 1100%).

PAU1250 even has a very high upturn, which can be explained by strain induced crystallization. Because of the similarity in structure, this upturn was also expected for PAU1500, but was not found. This might be due to differences in soft segment polydispersity between the different PAUs in combination with a relative low molecular weight.

EXAMPLES

Example 1

Synthesis of Poly(ε-caprolactone) (PCL)

Poly(ε-caprolactone) was synthesized in bulk using 1,4-butanediol as an initiator, which yields a telechelic polyester with two hydroxyl end groups. No catalyst or solvent was employed during the polymerization. After 7 days NMR analysis showed complete absence of monomer. The molecular weight was calculated based on the initial monomer-initiator ratio. The polyols had molecular weights between 750 and 4000 g/mol.

A typical procedure is as follows. A mixture of ε-caprolactone (100.28 g; 0.88 mol) and the initiator 1,4-butanediol (4.73 g; 0.052 mol) was reacted at 150° C. for 7 days to yield a polyester with a molecular weight of 2000 g/mol. $^1$H-NMR spectroscopy was used to verify full conversion of the polymerization. Six different poly(ε-caprolactone) diols were synthesized: 750, 1000, 1500, 2000, 3000 and 4000 g/mol.

$^1$H-NMR (CDCl$_3$ δ 7.26): δ 4.10 (t, 2H; OC$\underline{H}_2$), 3.65 (t; HOC$\underline{H}_2$), 2.25 (t, 2H; C$\underline{H}_2$CO), 1.62 (q, 2H; OCH$_2$C$\underline{H}_2$CH$_2$), 1.40 (q, 2H; OCH$_2$CH$_2$C$\underline{H}_2$) FT-IR (Golden Gate): 2941, 1720, 1471 cm$^{-1}$.

Example 2

Synthesis of Terephthaloyl Diisocyanate (TPHDI)

Terephthaloyl diisocyanate was synthesized using a modified version of the method of Tsuge et al., *Tetrahedron* 1967, 24, 2583-2590. Oxalyl chloride (5.15 ml; 0.06 mol) was added to a suspension of terephthalamide (3.28 g; 0.02 mole) in dichloroethane (30 ml). The HCl produced was trapped with a gas trap. After refluxing the mixture for 3 h a clear, slightly yellow, solution was obtained. The remaining oxalyl chloride and solvent were removed using a Rotavap apparatus at 40° C. and 10 mbar. The acylisocyanate was collected using a short path distillation apparatus (Büchi GKR-50) (T=110-120° C.; p=6·10$^{-2}$ mbar). The terephthaloyl diisocyanate formed transparent crystals with yields exceeding 98%. The isocyanate was stored under argon as it readily reacts with moisture from the air. Melting point 117° C.

$^1$H-NMR(CDCl$_3$ δ 7.26): δ 8.15 (s; ArH)

$^{13}$C-NMR (CDCl$_3$ δ 77): δ 166 (CO), 135 ($\underline{Ar}$CO), 129 (NCO), 126 (Ar) FT-IR (Golden Gate): 2240, 1779, 1704 cm$^{-1}$ Anal. calcd for (C$_{10}$H$_4$N$_2$O$_4$): C, 55.59; H, 1.85; N, 12.95. Found: C, 55.56; H, 1.83; N, 12.83.

Example 3

Synthesis of Polyacylurethane

The polyacylurethanes (PAU) according to the present invention were prepared by the following typical procedure. A powder-mixture of X gram poly(ε-caprolactone) (PCL) and Y gram TPHDI (terephthaloyl diisocyanate) was fed to a micro-extruder (DSM Research Products B.V., serial number 96053, The Netherlands) at 65° C. (cf. Table 1). The extruder operated with two co-rotating conical screws and was of the self-wiping type. The extruder was equipped with a loop extending the screw length and with a switch providing a choice between output of material and further extrusion.

TABLE 1

| PAU A | PCL X gram | Mol | TPHDI Y gram | Mol | TPHDI Z gram | Mol | Hard segment % calc. |
|---|---|---|---|---|---|---|---|
| PAU 500 | 7.00 | 0.0140 | 1.50 | 0.0069 | 1.50 | 0.0069 | 30.2 |
| PAU 750 | 7.00 | 0.0093 | 1.10 | 0.0051 | 1.10 | 0.0051 | 22.4 |
| PAU 1000 | 7.00 | 0.0070 | 0.75 | 0.0035 | 0.75 | 0.0035 | 17.8 |
| PAU 1250 | 7.00 | 0.0056 | 0.60 | 0.0028 | 0.60 | 0.0028 | 14.7 |
| PAU 1500 | 7.00 | 0.0047 | 0.50 | 0.0023 | 0.50 | 0.0023 | 12.6 |
| PAU 1750 | 7.00 | 0.0040 | 0.43 | 0.0020 | 0.43 | 0.0020 | 11 |
| PAU 2000 | 7.00 | 0.0035 | 0.38 | 0.0018 | 0.38 | 0.0018 | 9.7 |
| PAU 2500 | 7.00 | 0.0028 | 0.30 | 0.0014 | 0.30 | 0.0014 | 8 |
| PAU 3000 | 7.00 | 0.0023 | 0.25 | 0.0012 | 0.25 | 0.0012 | 6.7 |

The revolutions of the screws were set at 92 rpm, The extruder was heated to 130° C. and another Z gram TPHDI was added. After 2 minutes the pressure stops rising and the polymer is removed from the extruder. The overall retention time is approximately 6 minutes. For tensile tests the polyurethanes were dissolved in chloroform or dioxane (0.02 g/ml) and films were casted in a silanised petri-dish at room temperature. The preparation could also be performed by adding the TPHDI at once.

Example 4

Synthesis of 'Multi-Block' Polyacylurethane

A mixture of A gram powdered poly(ε-caprolactone), X gram 1,4-butanediol (BDO) and Y gram TPHDI was fed to a micro-extruder (DSM Research Products B.V., serial number 96053, The Netherlands) at 65° C. (cf. Table 2). The extruder was heated to 130° C. and another Z gram TPHDI was added. After 2 minutes the pressure stops rising and the polymer is, removed from the extruder. The overall retention time is approximately 6 minutes. For tensile tests the polyurethanes were dissolved in chloroform or dioxane (0.02 g/ml) and films were casted in a silanised petri-dish at room temperature. The preparation could also be performed by adding the TPHDI at once.

TABLE 2

|  | PCL A gram | Mol | BDO X gram | Mol | TPHDI Y gram | Mol | TPHDI Z gram | mol | Hard segment % calc. |
|---|---|---|---|---|---|---|---|---|---|
| 1:1 PAU 3000 | 6.80 | 0.0023 | 0.200 | 0.0022 | 0.5 | 0.0023 | 0.5 | 0.0023 | 14.8 |
| ½ PAU 3000 | 6.90 | 0.0023 | 0.100 | 0.0011 | 0.37 | 0.0017 | 0.37 | 0.0017 | 11.0 |
| ⅓ PAU 3000 | 6.90 | 0.0023 | 0.068 | 0.0008 | 0.34 | 0.0016 | 0.34 | 0.0016 | 9.6 |
| ¾ PAU 3000 | 6.85 | 0.0023 | 0.15 | 0.0017 | 0.43 | 0.0020 | 0.43 | 0.0020 | 11.2 |
| ½ PAU 2500 | 7.00 | 0.0028 | 0.081 | 0.0009 | 0.45 | 0.0021 | 0.45 | 0.0021 | 11.3 |

Example 5

Tensile Tests

Tensile tests were performed at 21° C. with a 100N load cell at an extension rate of 10 mm/min using au Instron (4301) tensile tester using rectangular (40×2.2×0.1 mm) shaped specimens cut from a solvent-cast film ($CH_2Cl_2$; films were allowed to dry overnight were dried filer in a vacuum oven at 37° C. for 24 h). The values obtained are an average of at least three samples (cf. Table 3).

TABLE 3

| Sample | Young's modulus (MPa) | Strain at break (%) | Tensile strength (MPa) |
|---|---|---|---|
| PAU750 | 96.1 | 13.5 | 8.0 |
| PAU1000 | 51.6 | 833.0 | 7.4 |
| PAU1250 | 26.5 | 1117.0 | 32.2 |
| PAU1500 | 33.4 | 1125.0 | 13.9 |
| PAU2000 | 155.8 | 626.5 | 9.1 |
| PAU3000 | 333.7 | 5.2 | 10.0 |
| PAU4000 | 342.8 | 8.1 | 16.1 |
| PCL | 344.0 | 12.2 | 15.1 |

The invention claimed is:
1. A polyacylurethane having the following general formula (I):

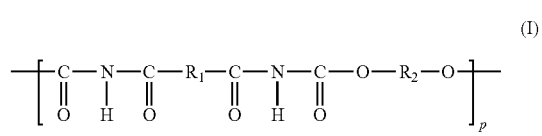

wherein:
$R_1$ is selected from the group consisting of alkylene groups, arylene groups, alkenylene groups and alkynylene groups, the alkylene groups, arylene groups, alkenylene groups and alkynylene groups optionally being substituted and having a number average molecular weight of 14 to 50,000;

$R_2$ is a residue derived from a polyesterpolyol having terminal hydroxyl groups, the polyesterpolyol having a number average molecular weight of 500 to 50,000;
p denotes the degree of polymerisation; and
wherein the polyacylurethane has a number average molecular weight of 1,000 to 100,000.
2. The polyacylurethane according to claim 1, wherein the polyesterpolyol having terminal hydroxyl groups has the formula (II):

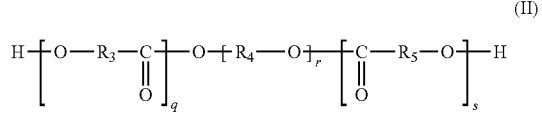

wherein $R_3$ and $R_5$ are independently selected from the group consisting of $C_1$-$C_{12}$ alkylene groups, $C_2$-$C_{12}$ alkenylene groups, $C_2$-$C_{12}$ alkynylene groups, $C_6$-$C_{20}$ cycloalkylene groups, $C_6$-$C_{20}$ cycloalkenylene groups, $C_6$-$C_{20}$ cycloalkynylene groups, $C_7$-$C_{20}$ alkarylene groups, $C_7$-$C_{20}$ arylalkylene groups, $C_8$-$C_{20}$ arylalkenylene groups and $C_8$-$C_{20}$ arylalkynylene groups, the alkylene groups, alkenylene groups, alkynylene groups, cycloalkylene groups, cycloalkenylene groups, cycloalkynylene groups, alkarylene groups, arylalkylene groups, arylalkenylene groups and arylalkynylene groups optionally being substituted with one or more substituents independently selected from the group consisting of $C_1$-$C_{12}$ alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups, $C_6$-$C_{12}$ cycloalkyloxy groups, halogens and silyl groups, wherein the silylgroups are represented by the formula $(R_6)_3Si-$, wherein $R_6$ is independently selected from the group consisting of $C_1$-$C_{12}$ alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups and $C_6$-$C_{12}$ cycloalkyloxy groups;

$R_4$ is selected from the group consisting of $C_2$-$C_{12}$ alkylene groups, $C_2$-$C_{12}$ alkenylene groups and $C_2$-$C_{12}$ alkynylene groups, wherein the alkylene groups, the alkenylene groups and the alkynylene groups are optionally interrupted by one or more heteroatoms, the heteroatoms being selected from the group consisting of O, N and S; and q, r and s are independently in the range of 1- 300.

3. The polyacylurethane according to claim 1, wherein $R_1$ is an arylene group.

4. The polyacylurethane according to claim 3, wherein the arylene group has a molecular weight of 76 to 1,000.

5. The polyacylurethane according to claim 2, wherein $R_3$ and $R_5$ are selected from $C_1$-$C_{12}$ alkylene groups.

6. The polyacylurethane according to claim 2, wherein $R_4$ is a $C_2$-$C_{12}$ alkylene group.

7. The polyacylurethane according to claim 2, wherein q, r and s are independently in the range of 1- 100.

8. The polyacylurethane according to claim 1, wherein the number average molecular weight of the polyesterpolyol having terminal hydroxyl groups is 500 to 10,000.

9. The polyacylurethane according to claim 8, wherein the number average molecular weight of the polyesterpolyol having terminal hydroxyl groups is 500 to 5,000.

10. A process for the preparation of a polyacylurethane, comprising reacting a diacylisocyanate compound of the following general formula (III):

(III)

with a polyesterpolyol having terminal hydroxyl groups of formula (IV):

(IV)

wherein:

$R_1$ is selected from the group consisiting of alkylene groups, arylene groups, alkenylene groups and alkynylene groups, the alkylene groups, arylene groups, alkenylene groups and alkynylene groups optionally being substituted and having a number average molecular weight of 14 to 50,000;

$R_2$ is a residue derived from a polyesterpolyol having terminal hydroxyl groups, the polyesterpolyol having a number average molecular weight of 500 to 50,000; and the polyacylurethane has a number average molecular weight of 1,000 to 100,000.

11. The process according to claim 10, wherein the polyesterpolyol having terminal hydroxyl groups has the formula (II):

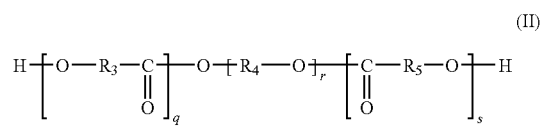

(II)

wherein $R_3$ and $R_5$ are independently selected from the group consisting of $C_1$-$C_{12}$ alkylene groups, $C_2$-$C_{12}$ alkenylene groups, $C_2$-$C_{12}$ alkynylene groups, $C_6$-$C_{20}$ cycloalkylene groups, $C_6$-$C_{20}$ cycloalkenylene groups, $C_6$-$C_{20}$ cycloalkynylene groups, $C_7$-$C_{20}$ alkarylene groups, $C_7$-$C_{20}$ arylalkylene groups, $C_8$-$C_{20}$ arylalkenylene groups and $C_8$-$C_{20}$ arylalkynylene groups, the alkylene groups, alkenylene groups, alkynylene groups, cycloalkylene groups, cycloalkenylene groups, cycloalkynylene groups, alkarylene groups, arylalkylene groups, arylalkenylene groups and arylalkynylene groups optionally being substituted with one or more substituents independently selected from the group consisting of $C_1$-$C_{12}$ alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups, $C_6$-$C_{12}$ cycloalkyloxy groups, halogens and silyl groups, wherein the silylgroups are represented by the formula $(R_6)_3Si-$, wherein $R_6$ is independently selected from the group consisting of $C_1$-$C_{12}$ alkyl groups, $C_2$-$C_{12}$ alkenyl groups, $C_2$-$C_{12}$ alkynyl groups, $C_6$-$C_{12}$ cycloalkyl groups, $C_1$-$C_{12}$ alkoxy groups, $C_2$-$C_{12}$ alkenyloxy groups, $C_2$-$C_{12}$ alkynyloxy groups and $C_6$-$C_{12}$ cycloalkyloxy groups;

$R_4$ is selected from the group consisting of $C_2$-$C_{12}$ alkylene groups, $C_2$-$C_{12}$ alkenylene groups and $C_2$-$C_{12}$ alkynylene groups, wherein the alkylene groups, the alkenylene groups and the alkynylene groups are optionally interrupted by one or more heteroatoms, the heteroatoms being selected from the group consisting of O, N and S; and q, r and s are independently in the range of 1- 300.

12. The process according to claim 10, wherein the process is conducted in the absence of a catalyst.

13. The process according to claim 11, wherein the process is conducted in the absence of a catalyst.

14. The process according to claim 10, wherein the process is conducted in the absence of a solvent.

15. The process according to claim 11, wherein the process is conducted in the absence of a solvent.

16. The process according to claim 10, wherein the process is conducted in an extruder.

17. The process according to claim 11, wherein the process is conducted in an extruder.

18. A process for the preparation of a polyacylurethane, comprising reacting a diacylisocyanate compound of the following general formula (III):

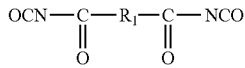 (III)

with a compound of the general formula (V):

HO—R$_3$—C(O)—OH (V)

and with a compound of the general formula (VI):

HO—R$_4$—OH (VI)

wherein:

R$_1$ is selected from the group consisting of alkylene groups, arylene groups, alkenylene groups and alkynylene groups, the alkylene groups, arylene groups, alkenylene groups and alkynylene groups optionally being substituted and having a number average molecular weight of 14 to 50,000;

wherein R$_3$ is selected from the group consisting of C$_1$-C$_{12}$ alkylene groups, C$_2$-C$_{12}$ alkenylene groups, C$_2$-C$_{12}$ alkynylene groups, C$_6$-C$_{20}$ cycloalkylene groups, C$_6$-C$_{20}$ cycloalkenylene groups, C$_6$-C$_{20}$ cycloalkynylene groups, C$_{-7}$-C$_{20}$ alkarylene groups, C$_{-7}$-C$_{20}$ arylalkylene groups, C$_8$-C$_{20}$ arylalkenylene groups and C$_8$-C$_{20}$ arylalkynylene groups, the alkylene groups, alkenylene groups, alkynylene groups, cycloalkylene groups, cycloalkenylene groups, cycloalkynylene groups, alkarylene groups, arylalkylene groups, arylalkenylene groups and arylalkynylene groups optionally being substituted with one or more substituents independently selected from the group consisting of C$_1$-C$_{12}$ alkyl groups, C$_2$-C$_{12}$ alkenyl groups, C$_2$-C$_{12}$ alkynyl groups, C$_6$-C$_{12}$ cycloalkyl groups, C$_{-1}$-C$_{12}$ alkoxy groups, C$_2$-C$_{12}$ alkenyloxy groups, C$_2$-C$_{12}$ alkynyloxy groups, C$_6$-C$_{12}$ cycloalkyloxy groups, halogens and silyl groups, wherein the silylgroups are represented by the formula (R$_6$)$_3$Si—, wherein R$_6$ is independently selected from the group consisting of C$_1$-C$_{12}$ alkyl groups, C$_{23}$-C$_{12}$ alkenyl groups, C$_2$-C$_{12}$ alkynyl groups, C$_6$-C$_{12}$ cycloalkyl groups, C$_1$-C$_{12}$ alkoxy groups, C$_2$-C$_{12}$ alkenyloxy groups, C$_2$-C$_{12}$ alkynyloxy groups and C$_6$-C$_{12}$ cycloalkyloxy groups; and R$_4$ is selected from the group consisting of C$_2$-C$_{12}$ alkylene groups, C$_2$-C$_{12}$ alkenylene groups and C$_2$-C$_{12}$ alkynylene groups, wherein the alkylene groups, the alkenylene groups and the alkynylene groups are optionally interrupted by one or more heteroatoms, the heteroatoms being selected from the group consisting of O, N and S; and the polyacylurethane has a number average molecular weight of 1,000 to 100,000.

19. The process according to claim 18, wherein the process is conducted in the absence of a catalyst.

20. The process according to claim 18, wherein the process is conducted in the absence of a solvent.

21. The process according to claim 18, wherein the process is conducted in an extruder.

22. A device comprising a polyacylurethane having the following general formula (I):

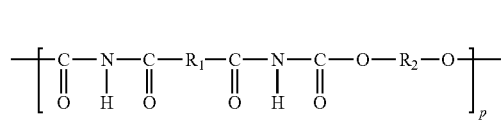 (I)

wherein:

R$_1$ is selected from the group consisting of alkylene groups, arylene groups, alkenylene groups and alkynylene groups, the alkylene groups, arylene groups, alkenylene groups and alkynylene groups optionally being substituted and having a number average molecular weight of 14 to 50,000;

R$_2$ is a residue derived from a polyesterpolyol having terminal hydroxyl groups, the polyesterpolyol having a number average molecular weight of 500 to 50,000;

p denotes the degree of polymerisation; and wherein the polyacylurethane has a number average molecular weight of 1,000 to 100,000 and the device is biodegradable, biocompatible and/or biomedical.

* * * * *